United States Patent [19]

Evans et al.

[11] 4,141,322
[45] Feb. 27, 1979

[54] INSECTICIDAL COLLAR FOR ANIMALS

[76] Inventors: Mack N. Evans, 1006 Maplewood Ct.; James D. Burnett, Rte. 5, Edgewood Village, both of Martinsville, Va. 24112

[21] Appl. No.: 785,951

[22] Filed: Apr. 8, 1977

[51] Int. Cl.² ............................................. A01K 27/00
[52] U.S. Cl. ...................................... 119/106; 119/156
[58] Field of Search .................. 119/106, 118, 156; 2/338

[56] References Cited

U.S. PATENT DOCUMENTS

| 146,770 | 1/1874 | Mersereau | 119/106 |
|---|---|---|---|
| 698,005 | 4/1902 | Geisenheimer | 2/338 |
| 2,401,253 | 5/1946 | Lamb, Jr. | 119/106 |

FOREIGN PATENT DOCUMENTS 168534  9/1921  United Kingdom ..................... 119/106

Primary Examiner—Louis G. Mancene
Assistant Examiner—Robert P. Swiatek
Attorney, Agent, or Firm—Stevens, Davis, Miller & Mosher

[57] ABSTRACT

An animal collar has a strip of synthetic resin containing a solid pesticidal composition laced through loops on the exposed surface of a leather, plastic or the like, strap which has a surface to be disposed against the animal's neck which is impervious to the pesticide and prevents it from contacting the animal's skin.

3 Claims, 3 Drawing Figures

U.S. Patent
Feb. 27, 1979
4,141,322
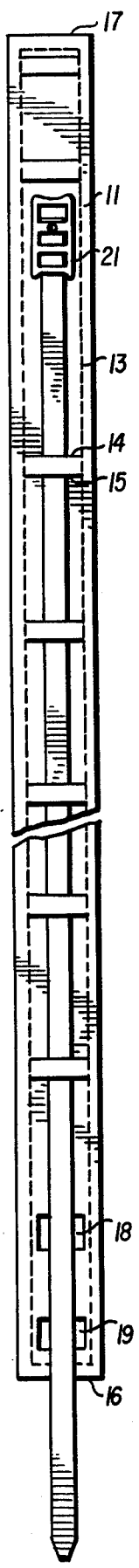
FIG. 1
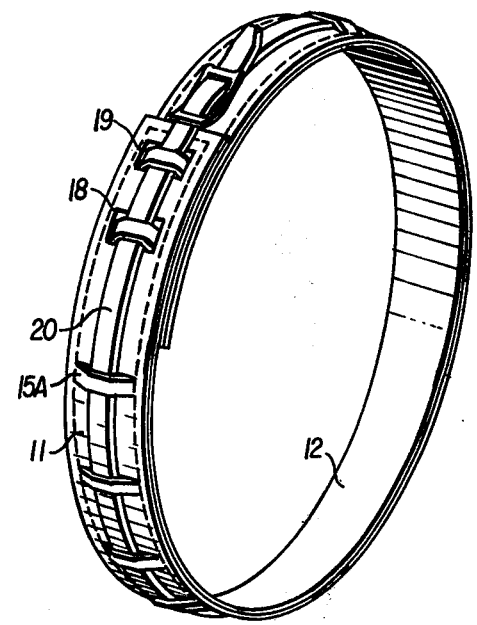
FIG. 2
FIG. 3
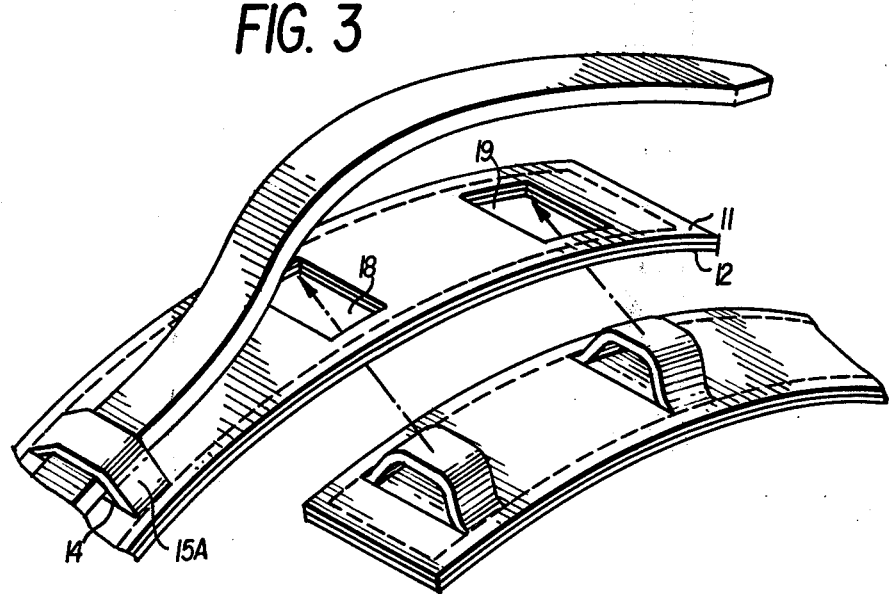

INSECTICIDAL COLLAR FOR ANIMALS

This invention relates generally to a collar for domestic animals and, more particularly, to a collar which will provide the animal with protection against ectoparasites such as ticks and fleas.

It has been proposed before to control ectoparasites on dogs and other domestic animals by using a synthetic resin composition containing a volatile pesticide in the form of a collar about the animal's neck. The disadvantage of such collars is that they irritate the skin on the animal's neck often to the extent that it is necessary to remove the collar and discontinue control of the ectoparasites. It also has been proposed in U.S. Pat. No. 2,025,711 to provide a collar for controlling ticks and fleas on dogs which has a pad of insecticide disposed between two plies of leather. A series of openings is provided in each ply of leather to expose the pad. A wire screen is provided between the inner ply and the pad to avoid direct contact between the pad and skin. This prevents the pad from directly contacting the skin unless fine particles are formed by crumbling or dusting of the pad with sifting of the insecticide through the screen. The latter phenomena can be expected to occur as the collar flexes when it is worn. Such contact of the skin by the insecticide will cause irritation. Various other types of insecticidal and deodorizing collars for animals and plastic or resinous insecticide compositions for use with animal collars are disclosed in U.S. Pat. Nos. 2,808,030; 3,477,409; 3,814,061; 3,852,416 and 3,904,746 but none of the heretofore available collars has been entirely successful.

It is therefore an object of this invention to provide a novel and effective insecticidal collar for domestic animals. Another object of the invention is to provide a collar for a dog or similar animal which will effectively protect the animal from ectoparasites without irritating the animal's skin.

Other objects will become apparent from the following description with reference to the drawing wherein FIG. 1 is a plan view of one embodiment of a collar for a dog adapted to support a synthetic resin-insecticide ring without it touching the animal;

FIG. 2 is a perspective view of the embodiment of FIG. 1 assembled with the ring member containing the insecticide; and FIG. 3 is an exploded fragmentary perspective view of the portions of the strap which overlap when the ends of the strap are fastened together to form a collar.

The foregoing objects and others are accomplished in accordance with this invention, generally speaking, by providing two plies of a suitable leather or other material secured together along their edges with only one of the plies having a series of longitudinally spaced loops through which a strip of material containing an insecticide is threaded and is supported away from the animal's skin when the collar is looped about the animal's neck. More specifically, the collar provided by the invention has a first lamina of leather or other material which is impervious to a powdered insecticide, a second lamina of similar material disposed over the first lamina which has a plurality of loops spaced along the length of the lamina, a strip of a synthetic resin or the like containing an insecticide disposed along the length of the laminated structure and through the loops, a means for fastening the ends of the laminated structure together and a means for fastening the ends of the strip containing the insecticide together to form an animal collar with the impervious lamina disposed between the animal's neck and the strip of insecticidal material.

The loops in the outer lamina of the collar which will support the strip which contains the insecticide may be formed by providing a series of longitudinally spaced pairs of laterally extending slits cut in the lamina or ply before it is secured to the second or inner lamina. The latter lamina is substantially impervious to fumes and powdered insecticide. The series of slits may begin near a first end of the lamina and continue to a point which is spaced longitudinally from the opposite end to provide a portion which will overlap an opposite end portion when the ends of the laminated strap are brought together to form a ring shaped collar. One or more rectangular openings are cut through both laminae of the strap. These openings all have dimensions which adapt them to receive one of the loops on the outer lamina of the strap. A plastic strip such as a commercially available flea collar is laced through the loops where fumes of insecticide will be released in proximity with the animal's fur but the strip will not contact the skin. The strap is converted into a collar by overlapping the two end portions of the strap with one or more loops adjacent the first end projecting through the openings in the opposite end and lacing the plastic strip containing an insecticide through the loops while they project through the openings to secure the two ends of the strap together. A buckle may be provided to secure the ends of the synthetic resinous or plastic strip together. This strip is supported by the laminated structure throughout its length without the strip contacting the animal's skin and without insecticidal fumes becoming concentrated between the collar and animal's skin. If, for some reason, the insecticidal strip or belt must be replaced, it can be removed from the loops and a new one substituted therefor.

The laminated strap may be prepared by stitching, adhesively bonding or otherwise securing two bands or strips of leather, fabric, plastic or the like together. A strap of indeterminate length may be formed with the loops in the top lamina and the holes through both laminae properly spaced and the strap then cut into the lengths required for making collars.

The plastic strip containing the insecticide may be a plasticized vinyl polymer and a suitable insecticide such as the one described in U.S. Pat. No. 3,904,746 or a strip of a composition of the kind disclosed in U.S. Pat. No. 3,852,416.

Referring now to the drawing, one embodiment of the protective collar of the invention is illustrated in FIG. 1. Leather strap 10 is a laminated structure having two leather laminae 11 and 12 secured together by stitching 13 along the lateral edges. A series of pairs of laterally extending slits 14 and 15 which terminate short of the stitching 13 are spaced longitudinally from near a first end 16 of strap 10 to a point spaced longitudinally from the second end 17 of the strap 10. Slits 14 and 15 are cut only through lamina 11. A pair of longitudinally spaced rectangularly shaped holes 18 and 19 extend through both laminae of strap 10. Those portions of lamina 11 disposed between slits 14 and 15 may be bulged outwardly to form a series of loops 15A spaced along the length of strap 10.

The strap 10 is converted into a collar as shown in FIG. 2 by overlapping the end portions with the loops 15A adjacent to the first end projecting through the holes 18 and 19. The plastic strip 20 containing an insecticide may be a commercially available flea collar. Strip 20 is laced through the loops including those projecting through holes 18 and 19. By passing through the loops which project through holes 18 and 19, strip 20 secures the overlapping end portions of strap 10 together. A buckle 21 may be provided to secure the ends of strip 20 together, if desired.

Strip 20 may be laced through all of the loops of strap 10 except the ones which will project through holes 18 and 19 before the end portions of strap 10 are overlapped. This assembly may then be placed around the neck of a dog or other animal with the end portions overlapping and the loops of one end of strap 10 projecting through holes 18 and 19. Strip 20 is then laced through the projecting loops to secure the end portions of strap 10 together. The ends of the strip 20 may then be secured together, if desired, with a buckle 21. The lamina 12 should be impervious to insecticide dust and fumes to prevent contact of the animal's skin by the dust or an irritating concentration of fumes under the collar. It will be noted that, since the lamina 12 worn adjacent to the animal's neck is not slit to form the loops and the first end portion of strap 10 underlies the opposite end portion having holes 18 and 19 when the two end portions are overlapped to form the collar, plastic strip 20 is prevented from contacting the animal's skin around the entire circumference of the collar. Hence, the animal is protected from skin irritation by the strip 20.

While a laminated strap of the type described is preferred and has been described in detail with reference to the drawing, the invention contemplates in its broader aspects a collar made from only one lamina of a suitable material suitably provided with longitudinally spaced loops. For example, the strap used for the collar may be molded synthetic resin or plastic, such as polyvinyl chloride, nylon or other suitable resin with integral loops or the collar may be made from a single lamina of leather, synthetic resin or fabric with loops sewn or otherwise secured to the outer surface.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. An animal collar comprising:
an elongated strap comprising first and second substantially longitudinally and transversely coextensive elongated laminae secured together, said strap being adapted to be disposed about an animal's neck with the second lamina being innermost and against the animal's neck, means defining in said first outermost lamina a plurality of outwardly extending transverse loops spaced longitudinally from each other throughout the length of the strap; and
an elongated strip laced through said loops with the second innermost lamina between the strip and the animal's neck, said strip containing a pesticidal composition for the control of ectoparasites.

2. An animal collar as claimed in claim 1, wherein:
each of said loops is defind by a pair of longitudinally spaced transverse slits through the first lamina, each of said slits having a length less than the width of the first lamina and having ends spaced from the longitudinal edges of the first lamina.

3. An animal collar comprising:
an elongated strap comprising first and second substantially longitudinal and transversely coextensive elongated laminae secured together, said strap being adapted to be disposed about an animal's neck with the second lamina being innermost and against the animal's neck, a series of longitudinally spaced transverse slits in the first outermost lamina having a length less than the width of the first lamina and terminating inwardly of the longitudinal edges thereof, each of said pairs of slits defining an outwardly extending loop therebetween, said loops being spaced throughout the length of the strap, a hole adjacent one end of the strap extending through the first and second laminae, said hole having transverse cross-sectional dimensions at least as great as those of one of the loops adjacent the other end of the strap so that said one loop can extend through said hole when the ends of the strap overlap; and
an elongated strip laced through said loops including said one loop extending through said hole in said strap with the second lamina between said strip and the animal's neck, said strip containing a solid pesticidal composition for the control of ectoparasites.

* * * * *